United States Patent [19]
Pilgram

[11] 3,884,910
[45] May 20, 1975

[54] TRIAZOLINONES
[75] Inventor: Kurt H. G. Pilgram, Modesto, Calif.
[73] Assignee: Shell Oil Company, Houston, Tex.
[22] Filed: Nov. 30, 1972
[21] Appl. No.: 311,008

[52] U.S. Cl............ 260/240 G; 260/308 C; 424/269
[51] Int. Cl............................................. C07d 55/06
[58] Field of Search..................... 260/240 G, 308 C

[56] References Cited
UNITED STATES PATENTS
3,396,163   8/1968   Hook et al........................... 260/240
3,780,052  12/1973   Cebalo et al..................... 260/308 C OTHER PUBLICATIONS
Kroeger, et al., C.A. 63: 16339–40, (1965), abstracted from Chem. Ber. 98(9), 3025–33, (1965).

Primary Examiner—Henry R. Jiles
Assistant Examiner—C. M. S. Jaisle

[57] ABSTRACT

4-Benzylideneamino-$\Delta^2$-1,2,4-triazolin-5-ones, of the formula

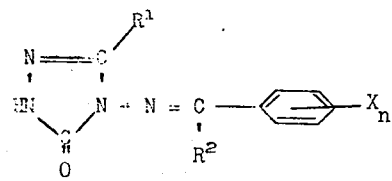

useful as herbicides, are prepared by reaction of a 4-amion-$\Delta^2$-1,2,4-triazolin-5-one or a salt thereof with the appropriate benzaldehyde or acetophenone.

1 Claim, No Drawings

TRIAZOLINONES

BACKGROUND OF THE INVENTION

1. Field of the Invention

This invention relates to new herbicides and to herbicidal compositions containing said herbicides. More specifically this invention relates to a new class or 4-benzylideneamino-Δ²-1,2,4-triazolin-5-ones, a new method for preparation of said 4-benzylideneamino-Δ²-1,2,4-triazolin-5-ones, new herbicidal compositions containing said compounds, and a new method for controlling undesirable plant growth using said compounds.

2. Summary of the Invention

The novel compounds of this invention are represented by the formula

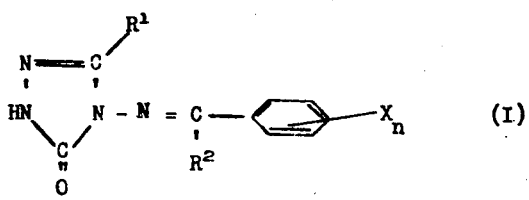

where $R^1$ is hydrogen, hydroxy or alkyl, $R^2$ is hydrogen or alkyl, X is hydrogen, halogen, perchloryl or $-Y_p-$ alkyl wherein the alkyl portion may be substituted by one or more halogens; Y is oxygen, sulfur, sulfinyl or sulfonyl, p is 0 or 1 and n is 1 to 5.

The compounds of Formula I are prepared by reaction of a 4-amino-Δ²-1,2,4-triazolin-5-one or a salt thereof with the appropriate benzaldehyde or an acetophenone. Herbicidal compositions of this invention comprise a compound of Formula I and an inert agricultural acceptable carrier therefor. Undesirable plant growth is destroyed or prevented by applying the compounds of the invention, ordinarily in a herbicidal composition of one of the afore-mentioned types, to either the unwanted vegetation itself or to the area to be kept free of such unwanted vegetation.

DETAILED DESCRIPTION OF THE INVENTION

Typical novel compounds of this invention are those of Formula I above wherein $R^1$ is hydrogen, hydroxy or alkyl of 1 to 4 carbon atoms, for example, methyl, ethyl, isopropyl, tertiary butyl and the like; $R_2$ is hydrogen or alkyl of 1 to 4 carton atoms, for example, methyl, ethyl, isopropyl, tertiary butyl and the like; X is hydrogen, halogen of atomic number 9 to 35 inclusive, that is, fluorine, chlorine or bromine, perchloryl, or $-Y_p-$ alkyl wherein by alkyl is intended an alkyl group of 1-4 carbon atoms optionally substituted by one or more halogen atoms of atomic number 9-35; Y is oxygen, sulfur, sulfinyl or sulfonyl; p is 0 or 1 and n is 1 to 5. Typical groups represented by $-Y_p-$ alkyl would thus include methyl, ethyl, isopropyl, tert-butyl, methoxy, ethoxy, isopropoxy, ethylthio, butylthio, chloromethyl, 1,2-dibromomethyl, trifluoromethyl, 1-chloroethylthio, trifluoromethoxy, trifluoromethylthio, trichloromethyl, trichloromethoxy, and the like.

Typical compounds contemplated for use within the scope of this invention include:

4-(3-perchlorylbenzylideneamino)-Δ²-1,2,4-triazolin-5-one.

4-(3-(trifluoromethylthio)benzylideneamino)Δ²-1,2,4-triazolin-5-one.

4-(4-chlorobenzylideneamino)-Δ²-1,2,4-triazolin-5-one 4-(3-(2,4-dichloro-benzylideneamino)-Δ²-1,2,4-triazolin-5-one.

4-(3-chloro-4-methylbenzylideneamino)-Δ²-1,2,4-triazolin-5-one.

4-(4-bromo-3-methylbenzylideneamino)-Δ²-1,2,4-triazolin-5-one.

4-(3-(pentafluororoethoxy)benzylideneamino)-Δ²-1,2,4-triazolin-5-one.

Preferred because of their high degree of herbicidal activity are those compounds represented by the formula

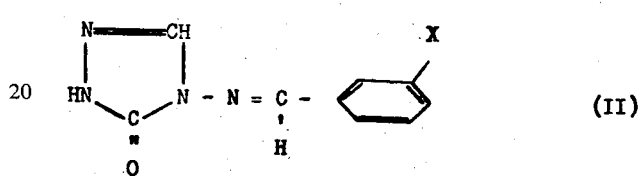

where X is as defined above.

Typical compounds of this subclass include 4-(3-(trifluoromethyl)-benzylideneamino)-Δ²-1,2,4-triazolin-5-one, 4-(3-chlorobenzylideneamino)-Δ²-1,2,4-triazolin-5-one, and 4-(3-(trifluoromethoxy)benzylideneamino)-Δ²-1,2,4-triazolin-5-one.

The herbicidal compounds of Formula I are prepared by the reaction of a 4-amino-Δ²-1,2,4-triazolin-5-one of Formula III or a salt thereof with a benzaldehyde or acetophenone according to the following reaction:

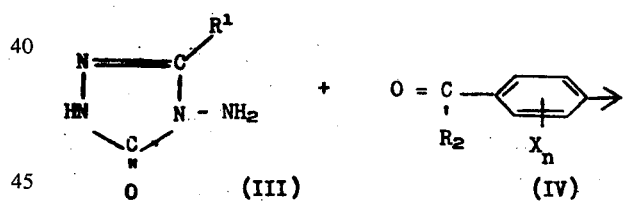

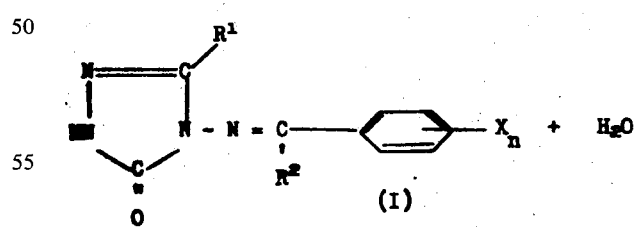

where $R_1$, $R_2$ and $X_n$ are as defined in Formula I. Typical salts of the compounds of Formula III contemplated for use within the scope of this invention include salts formed from inorganic or organic acids, for example, from hydrochloric, hydrobromic, hydroiodic, sulfuric, phosphoric, nitric, maleic, fumaric, citric, tartaric, methanesulfonic, ethanedisulfonic, acetic or benzoic acids.

The reaction is preferably carried out in a solvent, typically as an aqueous alcoholic medium, such as aqueous ethanol or aqueous methanol. While solvents other than water and alcohols can be used in these reactions, the use of solvents containing a carbonyl function, such as acetone and diethylketone, is prohibited because these solvents condense with the compound designated by Formula III and lower the yield of product obtained.

The reaction is carried out at a temperature ranging from 15° to 35°C. Ordinarily, the reaction proceeds to completion in 1 to 20 hours.

Any suitable conventional method can be used to recover the product designated by Formula I, for example, by evaporation of the solvent, extraction of the product followed by distillation of the solvent, and the like.

Compounds of this invention, for example, 4-(3-(trifluoromethyl)-benzylideneamino)-$\Delta^2$-1,2,4-triazolin-5-one and 4-(3-(trifluoromethoxy)-benzylideneamino)-$\Delta^2$-1,2,4-triazolin-5-one have been found to be active only against a limited number of plant species and are considered to be selective herbicides. Some of the compounds exhibit a high degree of herbicidal activity in the control of a variety of economically important species of grasses and broad-leaf weeds. Some of the compounds are particularly useful as selective herbicides for use in certain important crops.

The invention includes herbicidal compositions comprising a carrier or a surface-active agent or both a carrier and a surface-active agent and as active ingredient at least one 4-benzylideneamino-$\Delta^2$-1,2,4-triazolin-5-one of Formula I. Likewise the invention also includes a method of combatting weeds which comprises applying to the locus to be protected a herbicidally effective amount of 4-benzylideneamino-$\Delta^2$-1,2,4-triazolin-5-one of Formula I or a composition thereof.

The term carrier as used herein means a solid or fluid material which may be inorganic or organic and of synthetic or natural origin with which the active compound is mixed or formulated to facilitate its application to the plant, seed, soil or other object to be treated or its storage transport handling.

Suitable solid carriers are natural and synthetic clays and silicates, for example natural silicas such as diatomaceous earths; magnesium silicates, for example, talcs; magnesium aluminum silicates, for example, attapulgites and vermiculites; aluminum silicates, for example kaolinites, montmorillonites and micas; calcium carbonates; calcium sulfate; synthetic hydrated silicon oxides and synthetic calcium or aluminum silicates; elements such as for example, carbon and sulfur; natural and synthetic resins such as, for example, coumarone resins, polyvinyl chloride and styrene polymers and copolymers; solid polychlorophenols; bitumen, waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosene, light mineral oils; chlorinated hydrocarbons, such as for example, carbon tetrachloride, perchloroethylene, trichloroethane, including liquified normally vaporous gaseous compounds: Mixtures of different liquids are often suitable.

The surface active agent may be an emulsifying agent or a dispersing agent or a wetting agent; it may be non-ionic or ionic. Any of the surface-active agents usually applied in formulating herbicides or insecticides may be used. Examples of suitable surface-active agents are the sodium or calcium salts of polyacrylic acids and lignin sulfonic acids; the condensation products of fatty acids or aliphatic amines or amides containing at least 12 carbon atoms in the molecule with ethylene oxide-/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulfates or sulfonates of these condensation products, alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75% by weight of toxicant and usually contain in addition to solid carrier, 3–10% by weight of a dispersing agent and, where necessary, 0–10% by weight of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½ – 10% by weight of toxicant. Granules are usually prepared to have a size between 10 and 100 BS mesh (1.676 – 0.152 mm), and may be manufactured by agglomeration or impregnation techniques. Generally granules will contain ½ – 25% by weight toxicant and 0 – 10% by weight of additives such as stabilizers, slow release modifiers and binding agents. Emulsifiable concentrates usually contain, in addition to the solvent and, when necessary, co-solvent, 10–50% weight per volume toxicant, 2–20% weight per volume emulsifiers and 0–20% weight per volume of appropriate additives such as stabilizers, penetrants and corrosion inhibitors. Suspension concentrates are compounded so as to obtain a stable, non-sedimenting, flowable product and usually contain 10–75% w toxicant, 0.5 – 15% w of dispersing agents, 0.1 – 10% w of suspending agents such as protective colloids and thixotropic agents, 0 – 10% w of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick mayonnaise-like consistency.

The composition of the invention may also contain other ingredients, for example, other compounds possessing pesticidal, especially insecticidal, acaricidal, herbicidal or fungicidal, properties.

The method of applying the compositions of this invention comprises applying a 4-benzylideneamino-$\Delta^2$-1,2,4-triazolin-5-one ordinarily in a herbicidal composition of one of the afore-mentioned types to a locus or area to be protected from undesirable plant growth. The active compound, of course, is applied in amounts sufficient to exert the desired herbicidal action.

The amount of the 4-benzylideneamino-$\Delta^2$-1,2,4-triazolin-5-one to be used in controlling undesirable vegetation will naturally depend on the condition of the vegetation, the degree of herbicidal activity desired, the formulation used, the mode of application, the climate, the season of the year, and other variables. Recommendations as to precise amounts are therefore not possible. In general, however, application to the locus to be protected of from 0.1 to 10 pounds per acre of the herbicidal compounds of this invention will be satisfactory.

The preparation and some of the properties of the novel 4-benzylideneamino-$\Delta^2$-1,2,4-triazolin-5-ones of the invention are illustrated by the following Examples. It should be understood, however, that the Examples given are for the purpose of illustration only and are not to be regarded as limiting the invention in any way. In the Examples below the structure of all the products prepared was confirmed by elemental nuclear magnetic resonance and infrared analysis.

EXAMPLE 1

To a solution of 2.0 grams of 4-amino-$\Delta^2$-1,2,4-triazolin-5-one in 70 milliliters of 30% aqueous ethanol was added 2.9 grams of orthofluorobenzaldehyde. The solution was stirred at ambient temperature for 5 hours and filtered. Recrystallization of the filter cake afforded 3.9 grams of colorless crystalline material melting at 185° to 187°C representing a 90% yield of 4-(2-fluorobenzylideneamino)-$\Delta^2$-1,2,4-triazolin-5-one.

EXAMPLE 2

To a solution of 2.0 grams of 4-amino-$\Delta^2$-1,2,4-triazolin-5-one in 75 milliliters of water was added 3.5 grams of 3-(thifluoromethyl)-benzaldehyde. The mixture was stirred for 3 hours at ambient temperature and filtered. The filter cake was recrystallized from methanol to give 4.3 grams of colorless crystalline solid material melting at 166°-167°C representing an 84% yield of 4-(3-(trifluoromethyl)benzylideneamino)-$\Delta^2$-1,2,4-triazolin-5-one.

EXAMPLE 3 a. 3-(Trifluoromethoxy)benzimidazolide

To a stirred solution of 40.5 grams of N,N'-carbonyldimidazole (prepared from imidazole and phosgene using the method of Chem. Berichte 95, 1280 (1962)) in 400 milliliters of tetrahydrofuran was added dropwise at 20°C a solution of 51.5 grams of 3-(trifluoromethoxy) benzoic acid (prepared using the method of (Yagupolskii et al., J. Gen. Chem. (USSR), Engl. Translation, 31, 845 (1961)) dissolved in 200 milliliters of tetrahydrofuran. After $CO_2$ evolution ceased, the reaction mixture was concentrated to dryness under reduced pressure, extracted with cyclohexane, and concentrated to yield 56.7 g of a colorless oil representing an 88% yield of 3-(trifluoromethyl)benzimidazolide.

b. 3-(Trifluoromethoxy)benzaldehyde

A solution of 3.5 grams of lithium aluminum hydride in 1 liter of tetrahydrofuran was added dropwise with stirring over a period of 30 minutes at −20°C to a solution of 56.5 grams of the 3-(trifluoromethoxy)-benzimidazole prepared in (a) above. After standing for 2 hours, the reaction mixture was concentrated under reduced pressure. The residue was dissolved in methanol, acidified with sulfuric acid and diluted with methanol to a volume of 700 milliliters.

c. To a solution of 22.8 grams of 3-(trifluoromethoxy)benzaldehyde in 380 milliliters of methanol (prepared in (b) above) was added a slurry of 10.0 grams of 4-amino-$\Delta^2$-1,2,4-triazolin-5-one. The resulting solution was stirred at ambient temperature for 18 hours, concentrated to 200 milliliters and diluted with 500 milliliters water. The resulting solid was filtered and recrystallized from methanol to afford 13.0 grams of colorless crystalline solid melting at 126° to 129°C representing a 39% yield of 4-(3-(trifluoromethoxy)benzylidene-amino)-$\Delta^2$-1,2,4-triazolin-5-one.

EXAMPLE 4

To a solution of 3.0 grams of N-aminobicarbimide in 60 milliliters of 50% aqueous ethanol at 30° to 35°C was added 5 drops of concentrated hydrochloric acid and 5.6 grams of 3-(trifluoromethyl)benzaldehyde. The mixture was stirred at ambient temperature for 18 hours. The ethanol was removed under reduced pressure and the crystalline solid was filtered, washed with ether and dried to give 6.0 grams of colorless crystalline solid melting at 247° to 250°C representing a 75% yield of the tautomer N-(3-(trifluoromethyl)benzylideneamino)bicarbimide of 3-hydroxy-4-(3-(trifluoromethyl)benzylideneamino)-$\Delta^2$-1,2,4-triazolin-5-one.

EXAMPLE 5

A solution of 2.56 grams of 3-ethyl-4-amino-$\Delta^2$-1,2,4-triazolin-5-one, 3.48 grams of 3-(trifluoromethyl)benzaldehyde, and 2 drops of concentrated hydrochloric acid in 75 milliliters of water was stirred at ambient temperature for 2 hours. Filtration followed by recrystallization from ethanol afforded 4.0 grams of colorless crystalline solid melting at 190° to 191°C which represents a 71% yield of 3-ethyl-4-(3-(trifluoromethyl)-benzylideneamino)-$\Delta^2$-1,2,4-triazolin-5-one.

EXAMPLES 6 to 10

Following procedures similar to those given in previous Examples the compounds listed in Table I were prepared

TABLE I

4-BENZYLIDENEAMINO-Δ²-1,2,4-TRIAZOLIN-5-ONES

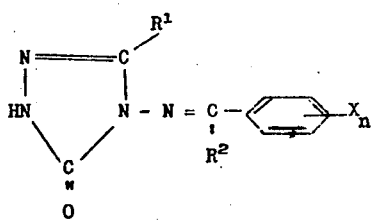

| Example Number | R¹ | R² | $X_n$ | Yield % | Melting point, degrees C |
|---|---|---|---|---|---|
| 6 | H | H | 2-Cl | 52 | 186-188 |
| 7 | H | H | 3-Cl | 34 | 185-186 |
| 8 | H | H | 2,6-Cl₂ | 34 | 185-187 |
| 9 | H | H | 3,4-Cl₂ | 45 | 217-218 |
| 10 | CH₃ | H | 3-CF₃ | 61 | 210-212 |

EXAMPLE 11

The pre-emergence herbicidal activity of the compounds of the invention was evaluated by planting seeds of watergrass and cress in test tubes, nominally measuring 25 × 200 millimeters, containing soil treated with the test compounds at the rate of 1 and 0.1 milligrams of the active compound per tube. The planted soil was held under controlled conditions of temperature, moisture, and light for 13 to 14 days. The amount of germination was then noted and the effectiveness of the test compound was rated on the basis of a 0 to 9 scale, 0 rating indicating no effect, 9 indicating death of the seedlings or no germination.

The post-emergence activity of the compounds of this invention was evaluated by spraying 10-day old pigweed plants and 7-day old crabgrass plants to runoff with liquid formulations of the test compound at rates of 0.56 milliliters of a 0.5% solution designated Rate I in Table II and 0.62 milliliters of a 0.04% solution designated Rate II in Table II of the active ingredient. The sprayed plants were held under controlled conditions for 10 to 11 days and the effect of the test chemical then evaluated visually, the results being rated on the 0 to 9 scale described above.

The general phytotoxicity of the compounds was evaluated by planting ryegrass and sowthistle plants in culture solutions treated with the test compounds at the rate of 10 parts and 1 part per million in solution. The plants were held under controlled conditions for 10 to 11 days. The amount of growth of the roots and shoots was noted, and the effectiveness of the test compound rated on the 0 to 9 scale described above wherein 9 indicates death of the plant.

The results of the tests are summarized in Table II.

I claim:
1. A compound of the formula

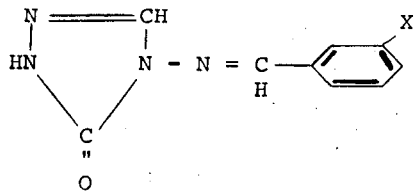

wherein X is chlorine, trifluoromethyl or trifluoromethoxy.

TABLE II

| Compound of Example | Pre-emergence | | | | Herbicidal Activity Post-emergence | | | | General - Solution | | | | | | | |
|---|---|---|---|---|---|---|---|---|---|---|---|---|---|---|---|---|
| | Watergrass | | Cress | | Crabgrass | | Pigweed | | Ryegrass | | | | Sowthistle | | | |
| | | | | | | | | | Roots | | Shoots | | Roots | | Shoots | |
| | 1 mg/ tube | 0.1 mg/ tube | 1 mg/ tube | 0.1 mg/ tube | Rate I¹ | Rate II² | Rate I¹ | Rate 2² | 10* | 1* | 10* | 1* | 10* | 1* | 10* | 1* |
| 1 | 4 | 2 | 7 | 3 | 4 | 0 | 7 | 4 | 0 | 0 | 0 | 0 | 2 | 0 | 0 | 0 |
| 2 | 9 | 9 | 9 | 9 | 9 | 7 | 9 | 6 | 7 | 6 | 9 | 9 | 9 | 4 | 9 | 8 |
| 3 | 9 | 7 | 9 | 9 | 9 | 9 | 9 | 5 | 9 | 8 | 9 | 8 | 7 | 6 | 9 | 7 |
| 5 | 0 | 0 | 2 | 0 | 0 | 0 | 0 | 0 | 1 | 0 | 1 | 0 | 0 | 0 | 0 | 0 |
| 6 | 1 | 0 | 8 | 0 | 0 | 0 | 7 | 2 | 3 | 0 | 3 | 0 | 5 | 0 | 2 | 0 |
| 7 | 9 | 0 | 9 | 8 | 9 | 8 | 9 | 0 | 7 | 5 | 9 | 4 | 8 | 0 | 8 | 0 |
| 8 | 1 | 0 | 8 | 0 | 0 | 0 | 0 | 0 | 1 | 0 | 3 | 0 | 1 | 0 | 0 | 0 |
| 9 | 1 | 0 | 9 | 0 | 9 | 4 | 3 | 0 | 4 | 0 | 5 | 0 | 4 | 0 | 3 | 0 |
| 11 | 2 | 0 | 6 | 0 | 0 | 0 | 0 | 0 | 4 | 0 | 5 | 0 | 0 | 0 | 0 | 0 |

*parts per million
¹Rate I is 0.56 milliliters of 0.5% solution
²Rate II is 0.62 milliliters of 0.04% solution